Aug. 26, 1969   R. M. RASHIDIAN   3,463,419
VARIABLE-GEOMETRY VEHICLE
Filed Aug. 17, 1967   3 Sheets-Sheet 3
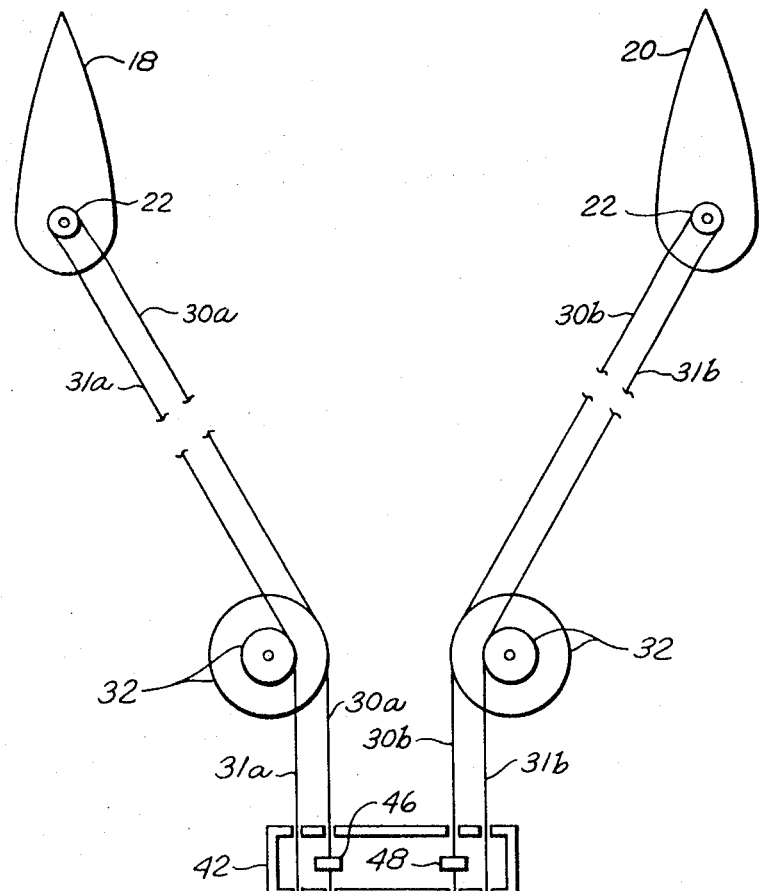
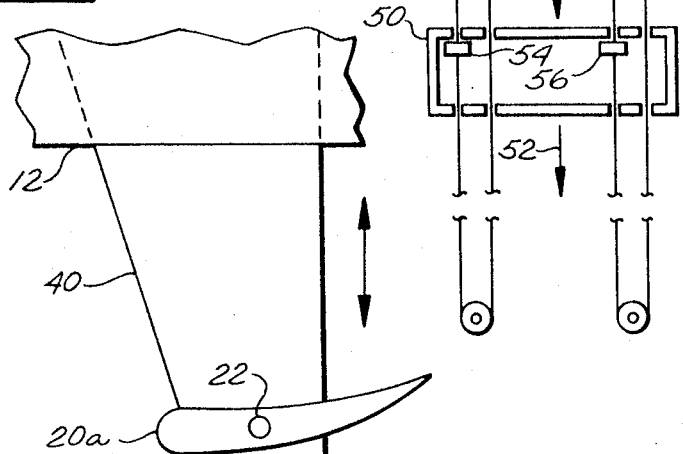
INVENTOR.
RASHID M. RASHIDIAN
BY
Sidney Magnes
AGENT

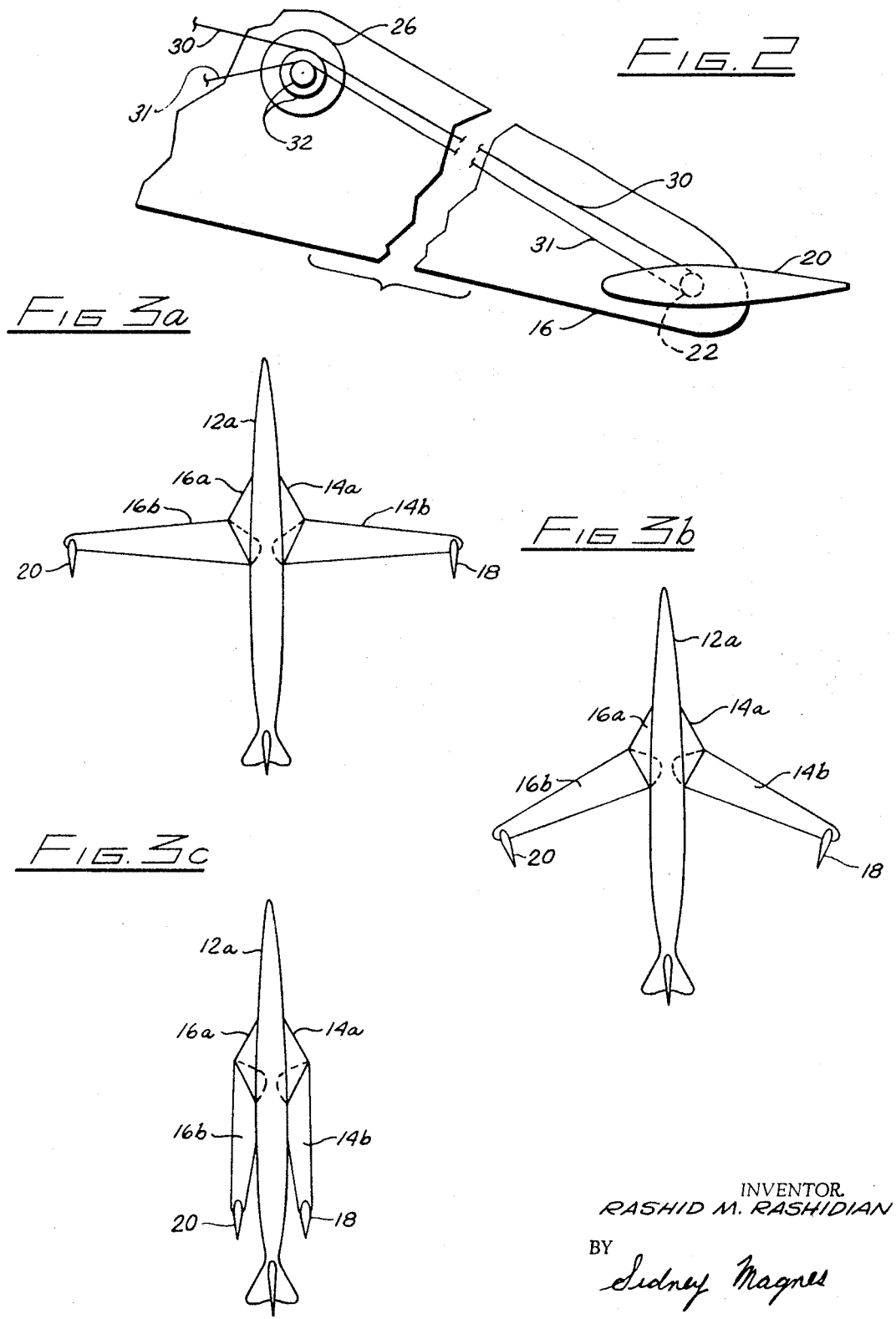

United States Patent Office 3,463,419
Patented Aug. 26, 1969

3,463,419
VARIABLE-GEOMETRY VEHICLE
Rashid M. Rashidian, Pomona, Calif., assignor to North American Rockwell Corporation, a corporation of Delaware
Filed Aug. 17, 1967, Ser. No. 661,324
Int. Cl. B64c 3/40
U.S. Cl. 244—46                                4 Claims

ABSTRACT OF THE DISCLOSURE

An arrangement for positioning the wings of a variable-geometry aircraft by means of aerodynamic flow across vertical fins located at the wing tips; thus generating sidewise forces that deploy or retract the wings—and using said fins as control surfaces.

BACKGROUND

It is well known that a preferred design of high-speed aircraft is one wherein the aircraft's "planform" (view from above) has a different wing configuration for high-speed flight than for low-speed takeoff and landings; this design being known as a "variable-geometry" aircraft. Generally speaking, the wings—or portions thereof—assume a low-aspect ratio, or are retracted for high-speed flight, so that the aircraft resembles an arrow; whereas the wings— or portions thereof—assume a high-aspect ratio, or extended configuration, for low-speed flight. In the past, so called "brute-force" techniques have been used to extend and retract the wings; the brute force being provided by hydraulic or electrical systems.

As airplanes and their wings become ever larger, the force necessary to deploy and retract the wings becomes ever greater; and at the present time, the wing-moving devices are becoming so massive and heavy that their size and weight are becoming important limitations of the aircraft's design.

OBJECTS AND DRAWINGS

It is an object of the present invention to provide an improved method and structure for deploying and retracting the wings of a variable-geometry aircraft.

It is another object of the present invention to provide apparatus that uses aerodynamic flow across a rotatable fin for generating sidewise forces that deploy or retract the wings.

It is a further object of the invention to provide vertical rotatable fins at the wing tips of a variable-geometry aircraft in order to (1) cause the wings to either pivot or slide in a deployable and a retractable manner, and (2) serve as control surfaces.

The attainment of these objects and others will be realized from a study of the following detailed description and the accompanying drawings, of which:

FIGURE 2 shows one way of controlling the rotatable fins;

FIGURES 3a, 3b and 3c show a partial swing-wing;

FIGURE 4 shows a sliding-wing aircraft using an embodiment of the invention; and FIGURE 5 shows another way of controlling the fins' position.

SYNOPSIS

Broadly speaking, the present invention, according to specifically described embodiments thereof, comprises rotatable control-surface fins mounted on the wings of a variable-geometry aircraft; so that the fins may be rotated in such a manner that they are acted upon by aerodynamic forces as the aircraft moves through the atmosphere. By suitably orienting the fins, the aerodynamic forces exert a suitably directed sidewise force on the fins, and the fins tend to move sidewise—thus "dragging" the wing outwards or inwards, depending upon the angle of the fin. Once the rotated fins have moved the wings to the desired position, the wings are locked at that orientation; and the fins are "feathered" in order to provide directional stability, recessed to provide minimal aerodynamic resistance, or used as rudder-type control surfaces.

DESCRIPTION

Figure 1B:
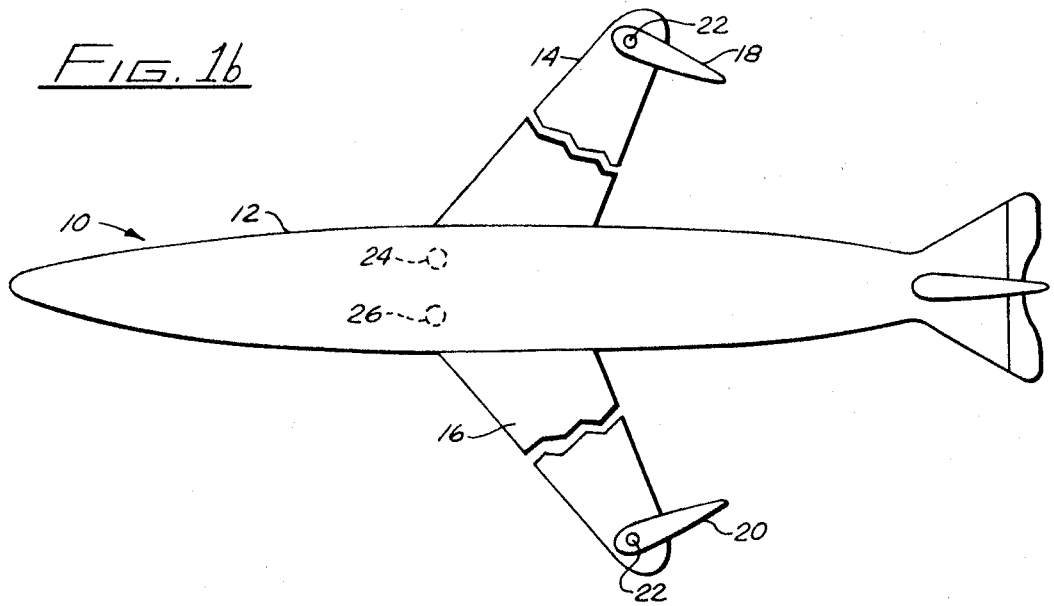
FIGURES 1a and 1b show a swing-wing aircraft using one embodiment of the invention.
Figure 1A:
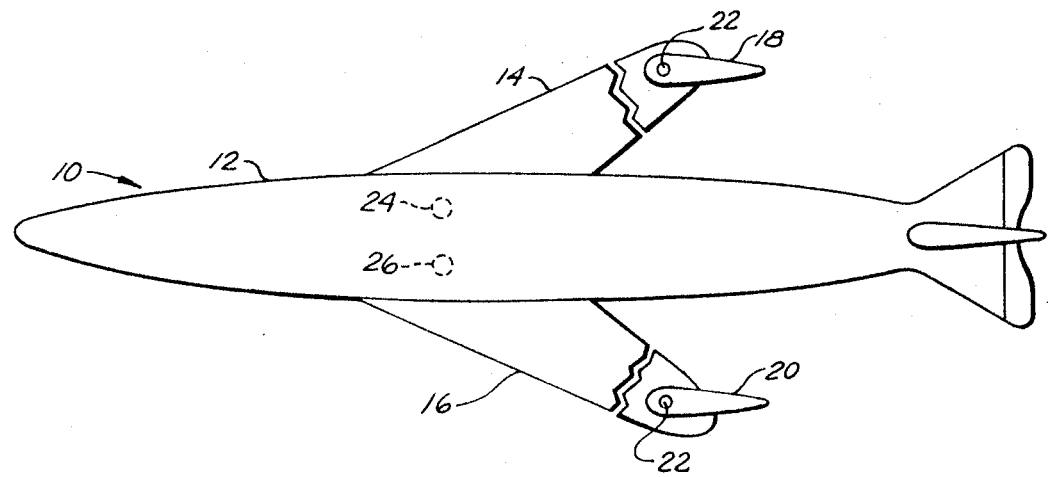

Referring now to FIGURE 1a, there is shown a planform of a swing-wing airplane 10 having a fuselage 12, and wings 14 and 16. At the outer tips of wings 14 and 16 are positioned vanes or fins 18 and 20 pivotally mounted on the wings on shafts 22; and the wings 14, 16 swing relative to the fuselage around pivot assemblies indicated at 24 and 26. Thus, wings 14 and 16 may be oriented to different angular positions, depending upon flight conditions. For example, during high-speed flight, the wings are "swept back," pivoting around assemblies 24 and 26 to take the swept-back position shown in FIGURE 1a; the fins 18 and 20 being shown as feathered (pointed into the airstream).

As the airplane comes in for a landing or reduces its speed for some other reason, vanes 18 and 20 are rotated outwardly as indicated in FIGURE 1b, so that the aerodynamic force of the air flowing past the outwardly canted fins produces outward thrusts that drag the wings outwardly; causing the wings to pivot about their pivot assemblies 24, 26 to assume low-speed positions shown in FIGURE 1b.

In order to assure symmetrical positioning and movement of the wings, they are ordinarily geared together (see U.S. Patents 1,718,617 and 1,890,354); and when the desired wing orientation has been attained, the wings are locked in that orientation by suitably braking or locking the gear arrangement. At that time the fins 18 and 20 are feathered, or—if desired—folded into suitable recesses.

When the airplane takes off, the wings are locked in the extended position indicated in FIGURE 1b; and as the airplane gains speed, the wings are to be swept back. In order to do this, fins 18 and 20 are rotated inwardly, to produce an inward aerodynamic force that causes the wings to assume their retracted positions; whereupon the aircraft has the correct planform for the desired high-speed flight conditions. At this time, as indicated previously, the wings are locked in position, and the fins are feathered or recessed for minimal drag.

It may thus be seen that in accordance with the present invention, the wings may be deployed or retracted without the use of heavy brute-force wing-moving mechanisms; the disclosed arrangement providing wing-deployment and wing-retraction using the aerodynamic forces of the wing streaming past the fins.

The fins are readily rotated by means of a simple lightweight cable system shown in FIGURE 2. Here the broken-away view shows a cable 30, 31 riding on idler pulleys or guides 32 at or near the wing pivot 26; and connected to shaft 22 in a wrap-around manner—although a lever arrangement may be used. A pull on cable 30 causes it to rotate fin 20 in an outward direction; and cable 30, 31 and/or fin 20 and/or shaft 22 may then be locked in position by any well known means. Feathering the fin is achieved in a similar manner; i.e., by pulling on cable 31. In this way, a lightweight simple cable arrangement may be used to rotate both fins, and thus achieve wing movement; the wing movement using the forces produced by aerodynamic flow, rather than a brute-force power system.

Under some conditions, it might be desirable to rotate the fins by means of motors or a hydraulic system, rather than by a cable arrangement—in which case a low-power system is attached to shaft 22, rather than using the high-power wing-pivoting devices previously needed, since large aero-dynamic forces produce the actual wing movement.

It should be noted that for ground servicing, the wings may be moved by manual or motor means that operate the gear arrangement.

Some airplane designs have a two-piece composite wing structure. In this design, the inner primary portion of the wing is fixedly positioned, and only the outer auxiliary portion of the wing is movable—being lockable in a plurality of different positions. This concept is illustrated in FIGURE 3, wherein the fully extended planform of FIGURE 3a shows the fuselage 12a, the fixedly positioned inboard wing-portions 14a, 16a, the positionable outboard wing portion 14b, 16b, and the rotatable fins 18 and 20. In FIGURE 3b the partially swept planform is shown, and the fully-swept planform is illustrated in FIGURE 3c. In this arrangement the movable wing-portions 14b, 16b are pivotally mounted to the fixed wing portions 14a, 16a and, as described in connection with the embodiment of FIGURE 1, may be interconnected for movement in unison by suitable means (not shown) such as interconnecting gearing, linkage, cables, or by electromechanical devices such as hydraulic or electric motors operated by coordinated electrical signals.

FIGURE 4 indicates a slidable-type wing 40 that is deployed and retracted by sliding inwardly and outwardly of the fuselage 12, rather than pivoting. In this arrangement, fin 20a is suitably rotated on shaft 22 as described above; and the sidewise force that is developed causes wing 40 to slide on guide rails (not shown). Here too, a lightweight dependable cable arrangement is preferred for operating fin 20a although power-driven arrangements may be used.

It should be noted that even if a power drive is used, only a small amount of force is necessary—since the power drive rotates a small fin, rather than moving a massive wing.

Due to the aerodynamic forces tending to retract the wings during flight, the wing-retracting function requires a relatively slight force from the fins, whereas wing deployment requires a large force. Therefore the fins may be designed in the manner of an airplane wing, as shown at 20a in FIGURE 4, to produce sidewise "lift" that exerts a maximal outward force.

Since the locked feathered position of the fins tends to produce longitudinal stability, the area of the stabilizers may be advantageously reduced. In addition, the fins are repeatedly reusable, rather than being a one-time expendable device, such as a deployable parachute. It should be noted that the fin orientation may be controlled, to provide either slow or rapid wing movement, as desired.

If desired, the fins may be linked (electromechanically, for example, as by actuating motors operated by common command signal) to act as rudders, thus either aiding or replacing the previously used rudders. As indicated schematically in FIGURE 5, cable 30a–31a controls the positions of fin 18; and cable 30b–31b controls the position of fin 20. The fins may be oriented for wing movement or for auxiliary rudder use by any suitable arrangement, such as the one indicated in the illustration.

For wing movement, a "collective" yoke such as 42 may be used. When it is moved downward, in the direction of arrow 44, yoke 42 abuts clamps 46 and 48 that are firmly affixed to cables 30a and 30b, respectively. Further yoke movement causes fins 18 and 20 to be collectively canted outwardly, thus deploying the wings. Moving yoke 42 upwards causes the fins to cant inwardly, thus retracting the wings.

For rudder use, "differential" yoke 50 is used. The wings are locked in position, and moving yoke 50 downward in the direction of arrow 52 causes it to abut cable clamps 54 and 56—thus causing fin 18 to turn inwardly, while fin 20 turns outwardly. This fin movement causes them to act as auxiliary rudders, turning the vehicle to the right.

For a left turn, yoke 50 is moved upward, abutting cable clamps 54 and 56, and rotating the fins so that their action turns the vehicle to the left.

In this way the fins may be used for both wing movement when the wings are unlocked, and as auxiliary rudders when the wings are locked in position.

It should be noted that if the wing is unlocked, and the fins are canted to a given angle, the wings will move to a position of substantially aerodynamic stability.

What is claimed is:

1. In a variable-geometry aircraft;
    means, comprising aerodynamic control-surface means positioned at a fixed location of the wing-tip portion of said aircraft, for aerodynamically generating the principal sidewise forces for moving said wing to a desired position relative to the fuselage of said aircraft while maintaining the original structural cross-section of at least the inboard portion of the wing—whereby said wing-moving means provides a variable aircraft planform, while minimizing the weight of said wing-moving means relative to prior wing-moving apparatus.

2. The combination of claim 1 wherein said control-surface means comprises a vertical pivotable fin fixedly mounted to said wing, said mounting transferring said sidewise wing-moving forces from said fin to said wing.

3. The combination of claim 2 wherein said control surface means comprises a lifting cross-section for exerting increased outwardly-directed aerodynamic forces.

4. A variable-geometry vehicle comprising:
    a wing-portion mounted on said vehicle, said wing portion being movable between retracted and extended positions for variable-planform flight conditions while maintaining the original cross-section of at least the inboard portion of the wing;
    means for selectively locking the movable wing portion to a selected planform;
    a dual-purpose fin rotatably mounted on the tip-portion of said movable wing portion;
    means for operating said fin as a rudder with said movable wing portions locked to effect control of the vehicle; and
    means for operating said fin as a wing-moving element with the movable wing portion in unlocked position for aerodynamically generating the principal force to effect transverse movement of the movable wing portion to a planform of substantially aerodynamic equilibrium—whereby the movable wing portion may locked in its new planform and the fin again employed to control the vehicle.

References Cited

UNITED STATES PATENTS

| 2,858,091 | 10/1958 | Kapenkin | 244—46 X |
| 2,915,261 | 12/1959 | Wallis | 244—46 |

FOREIGN PATENTS

| 399,048 | 9/1933 | Great Britain. |
| 30,264 | 5/1952 | Australia. |

MILTON BUCHLER, Primary Examiner

JEFFREY L. FORMAN, Assistant Examiner

U.S. Cl. X.R.

244—87, 91